Dec. 7, 1954   C. VAN AUSDALL   2,696,282
CENTRIFUGAL CLUTCH
Filed Aug. 9, 1952

INVENTOR.
CARL VAN AUSDALL
BY
Joseph J. Zugelter
Atty.

United States Patent Office 2,696,282
Patented Dec. 7, 1954

2,696,282

CENTRIFUGAL CLUTCH

Carl Van Ausdall, Liberty, Ind.

Application August 9, 1952, Serial No. 303,589

6 Claims. (Cl. 192—105)

This invention relates to a centrifugal clutch, or a clutch which engages automatically when a moving part thereof is rotated at speeds above an idling speed.

An object of the invention is to provide an improved construction in centrifugal clutches, whereby the engagement and disengagement of the clutch members are rendered reliable at certain speeds, and smooth in operation.

Another object is to provide an improved centrifugal clutch construction, whereby are greatly facilitated the manufacture and assembly of parts, and the servicing of the clutch in use, so that cost will no longer be a deterrent to popular use of automatic clutches in place of manually controlled clutches.

A further object is to provide a centrifugal clutch construction embodying simple, inexpensive, and durable parts which are easily manufactured by mass production methods, and assembled with the expenditure of a minimum amount of time and labor, resulting in a substantial cost advantage.

Another object is to reduce the number of moving parts in a centrifugal clutch, and to minimize wear at all vital locations, for the purpose of simplifying and minimizing the maintenance requirements, with obvious advantages resulting.

The foregoing and other objects are attained by the means described herein, and illustrated upon the accompanying drawing, in which.

Figure 1:
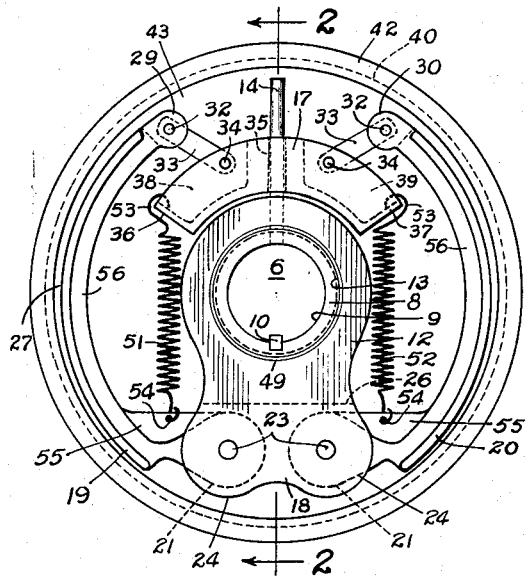
Figure 1 is an end view of the improved centrifugal clutch, as seen in looking from left to right on Figure 2.

Centrifugal clutches of the general type herein disclosed, have been developed heretofore in many forms with more or less success in the manufacture and sale thereof; however, the use of such clutches has never become very general for several reasons. Amongst the primary reasons for failure of centrifugal clutches to enjoy greater popularity, was the cost involved in manufacture. Clutches as designed in the past involved the use of complicated and expensive parts not readily adaptable to mass production methods of manufacture, and in many instances the parts were fragile and subject to excessive wear, with the result that maintenance costs were high, and the frequent need for removing the clutches from service became an intolerable nuisance.

Another item of excessive cost in the production and maintenance of known centrifugal clutches, was the labor involved in assembly and disassembly of the clutches. This item of expense resulted from a failure to so design the prior clutches and their constituent parts, as to facilitate and expedite assembly in a convenient and orderly manner, with the elimination of unnecessary assembly operations and specialized fitting of parts. These factors produced continuing difficulties of an expensive nature when the clutches showed signs of wear and required servicing. It was common practice in the past, to remove the worn clutches from service and return them to the factory for repairs, rather than make the necessary repairs on the job, because of the difficulties usually encountered in the effort to make parts replacements.

The centrifugal clutch of the present invention embodies structural changes and improvements resulting in elimination or at least a minimization of the faults generally inherent in centrifugal clutches as previously constructed, to the end that such devices may better perform the functions for which they were intended, and with a substantial increase in popular usage. The improved clutch is described as follows, with reference to the accompanying drawing.

Represented at 6 is the drive shaft of a motor, engine or other prime mover, a portion of which is indicated at 7. For the purposes of this description, the drive shaft 6 may be regarded as one which is constantly rotating, but controllable as to speed of rotation. The shaft is capable of rotating at idling speed, and at higher speeds at which the clutch is designed to engage. At the lower speeds, the clutch is adapted to disengage.

At 8 is indicated a sleeve upon which the clutch proper is built, the sleeve serving to mount the clutch upon the drive shaft 6. The bore 9 of the sleeve may be dimensioned to accommodate drive shafts of different diameters, as may be required. By means of a key 10, or other suitable expedient, the mounting sleeve is caused to rotate with the drive shaft.

The sleeve 8 has fixed thereto a rotor block 12, which is elongate and symmetrical in form, said rotor block having formed therein near one end a transverse bore 13 to snugly receive the mounting sleeve 8. To avoid rotation of rotor block 12 relative to the sleeve, these parts may be suitably locked together, as by means of a post 14 driven into the aligned bores 15 and 16 of the rotor block and the mounting sleeve, respectively. This post 14 extends radially of the sleeve 8 along the major axis of the rotor block, and may perform the function of a guide for the shiftable toggle block 17, later to be described.

At the outer or swinging end 18, the rotor block is suitably formed or machined to provide pivotal mountings for a pair of elongated clutch shoes 19 and 20. Each shoe may be provided with a flattened pivot head 21 pierced or transversely bored as at 22 to receive a pivot member or pin 23. The width of each shoe may approximate the thickness of the rotor block 12, and the shoes are disposed in the plane of said block. The pivot heads 21 of the shoes are reduced in thickness, so as to fit loosely between the perforated ears 24 and 25 of the rotor block. The ears may be formed, if desired, by milling the outer portion 18 of the rotor block edgewise, thereby to form a channel whose base is indicated by the broken line 26 in Fig. 1. The ears 24 and 25, and their pivot members 23, are equidistant from the major axis of the rotor block, which axis in Fig. 1 is vertical. It may be noted that the guide post 14 includes the major axis of the rotor block.

Each clutch shoe 19 and 20 includes an arcuate friction face or area 27 of an extent approximating a quarter circle, and at one end of the shoe is formed the pivot head 21 which is offset inwardly of the shoe. The opposite end of the shoe may be provided with a socket 28 formed between a pair of spaced parallel ears 29 and 30 integral with the shoe. The ears 29 and 30 are located at the tail end of the shoe, and in the normal position of the shoes, all of the ears are equidistant from the major axis of the rotor block. The ears are perforated at 31 to receive pivot members or pins 32 which pass through the outer ends of the toggle links 33. The inner ends of the toggle links are pivoted to the weighted toggle block 17 at locations 34, the pivots 34 being at opposite sides of the guide post 14, and equidistant therefrom.

The toggle block 17 is preferably, though not necessarily, arcuate in form, and has a central radial aperture or bore 35 for loosely accommodating the guide post 14 upon which the toggle block is adapted to slide. The toggle block may be formed with elongate opentopped sockets or channels 38 and 39, the outer ends of which are closed by end walls 36 and 37. The pivot members 34 for the inner ends of the toggle links pass transversely through the sockets or channels 38 and 39. It will be understood that the toggle links 33, which are rectangular in cross-section, fit nicely between the side walls of the sockets or channels 38—39, so that the links are thereby kept in substantially coplanar relationship as they shift about the pivots 34 whenever the toggle block 17 moves outwardly toward the free end of the guide post 14. The construction disclosed conserves space within the confines of the clutch, and permits the use of a toggle block which is durable and of ample size and weight. The opposite side walls of the sockets or channels 38—39 serve to keep the links 33 and the clutch shoes in coplanar relationship when extended or expanded, while at the same time precluding any tendency of the toggle block 17 to rotate about the guide post 14. The construction just described enhances the durability and serviceability of the various clutch parts, and permits them to be formed of ample proportions.

Surrounding the clutch shoes and all the parts to which they are connected, is a cylindrical body member or drum 40, preferably of cup shape, providing an inner friction face or area 41 to be engaged by the clutch shoes 19 and 20 when the latter are extended outwardly by the action of the toggle block and links 33. The body member or drum may be inexpensively formed from sheet metal, preferably steel or a steel alloy, the formation of the body member being performed as a single pressing or drawing operation. In the course of formation, the cup shaped body member may easily be provided with an outwardly extending continuous reinforcing flange 42, to avoid distortion of the body member by the expansive action of the clutch shoes. The body member may include also a solid circular wall 43 centrally apertured as at 44. To the outer face of wall 43 may be welded or otherwise fixedly applied a power transmission element 45, which may be in the form of a sprocket or a pulley, as shown. The power transmission element preferably has an anti-friction bearing mounting upon one end of the sleeve 8, so that the sleeve may rotate with shaft 6 without any strong tendency to rotate the power transmission element 45 and the cylindrical body member 40 thereto attached. For this purpose, a roller bearing 46 or its equivalent may be interposed between the power transmission element 45 and the mounting sleeve 8. As will be understood, the parts 45 and 40 may be held stationary, while all of the remaining parts of the clutch rotate with the drive shaft 6.

Figure 2:
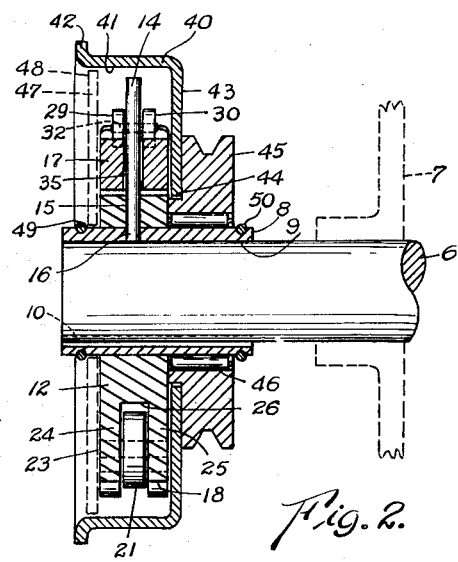
Figure 2 is a cross-sectional view taken on line 2—2 of Figure 1, showing in broken lines a clutch cover plate and part of a driving means such as a motor or engine.

In Fig. 2 there is shown by means of broken lines 47, a circular solid plate of metal or other suitable material, applied over the outer end of the mounting sleeve 8, to preclude entry of dirt, moisture and other foreign substances into the working parts of the clutch. The outer peripheral edge 48 of plate 47 may extend very close to the inner face 41 of the body member, but should not be in contact therewith. The protective plate may be held in position closing the open end of the body member, with the use of any suitable retaining means, for example, a slip ring 49 applied to a groove formed exteriorly of the mounting sleeve 8. A similar retainer 50 may be applied at the opposite end of the mounting sleeve, if desired, to hold in place the anti-friction bearing 46 and the parts 45 and 40.

Figure 4:
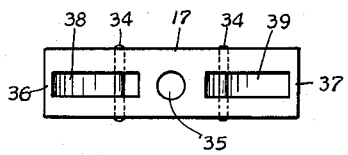
Figure 4 is a top plan view of a shoe actuator responsive to centrifugal force, and restrained normally by spring means as indicated upon Figure 1.
Figure 3:
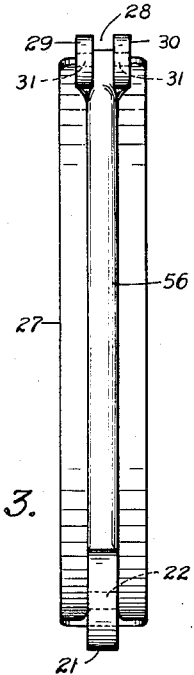
Figure 3 is an elevational view of a shoe illustrated in plan upon Figure 1, and on a slightly enlarged scale.

Referring to Figs. 1 and 4, it may be noted that means are provided, preferably in the form of a pair of coiled tensioned springs 51 and 52, to yieldingly restrain the toggle block 17 against outward displacement until centrifugal force of a predetermined value is available for engaging the clutch. The torsional force of the springs is such that centrifugal force acting upon the toggle block will overcome the restraining force of the springs, at a predetermined or preselected speed of rotation of the drive shaft 6. As the toggle block moves outwardly by the action of centrifugal force, the links 33 are caused to approach a condition of alignment one with the other, thereby to move the shoes outwardly against the drum with a wedging force that progressively increases in value. The resulting clutch engagement is powerful and positive. In the automatic disengagement of the clutch occurring by reduction in speed of the drive shaft, retraction of the shoes by the action of the toggle likewise is rendered positive and reliable. The construction disclosed ensures also a clutch operation which is equally effective whether the clutch is driven in a clockwise direction, or a counter-clockwise direction.

The upper ends of the springs may be anchored simply and quickly to the toggle block 17 by applying the hooked ends 53 thereof over the end walls 36 and 37, while the opposite ends of the springs are passed through small perforations 54 in the reinforcing webs 55 located adjacent to the pivot heads 21 of the clutch shoes. Each clutch shoe may be provided with a reinforcing rib 56 extending substantially from end to end of the shoe, for imparting the necessary strength and resistance to distortion.

To ensure smooth operation of the clutch in engaging and disengaging, and to prolong the life of the clutch to the greatest possible extent, the clutch shoes are fabricated of a bearing metal such as brass or bronze, or an alloy containing these metals. As was previously stated herein, the cylindrical body member or drum 40 preferably is fabricated from pressed or drawn steel, which in cooperation with the shoes of bearing metal, results in a clutch action that is smooth and highly resistant to wear.

From the foregoing explanation, it will readily be apparent that a centrifugal clutch as herein disclosed possesses many features of merit, including extreme simplicity, and great durability. The present clutch may be inexpensively manufactured and assembled, and kept in proper repair, without resort to skilled and expensive labor. Other advantages have been pointed out previously herein, and still others will be manifest to persons skilled in the art to which the invention relates.

What I claim is:

1. An automatic clutch operable by centrifugal force, comprising in combination, an elongate rotor block including means for fixedly mounting same upon a drive shaft for rotation with the shaft, said block having an end bifurcated and pierced to provide two pairs of perforate ears equidistant from the major axis of the block, a pair of shiftable elongate clutch shoes each including an arcuate friction area, and ends defining said friction area, a transversely apertured pivot head at one end of each shoe offset from the friction area, said heads each being loosely received between a pair of the perforate ears of the rotor block, and pivot members passing through the aperture of each pivot head and the perforations of the ears between which each pivot head is embraced, for rockingly mounting the shoes upon the rotor block, a pair of spaced perforate ears at the remaining end of each shoe providing a socket thereon, said sockets being spaced from one another equidistantly from the major axis of the rotor block, a guide post fixed upon the rotor block to include the major axis thereof, said post having a free end extending between the shoe sockets and in a direction away from the pivot heads of the shoes, a weighted toggle block having an enlarged central guide bore accommodating the guide post, and upon which the toggle block may slide radially between the shoes and lengthwise of the major axis of the rotor block in the plane of the latter, a pair of toggle links each having an outer end, means pivoting said ends within the sockets of the shoes, an inner end on each toggle link, and means pivoting said inner ends to the toggle block at opposite sides of the guide bore, means yieldingly opposing outward displacement of the toggle block by centrifugal force generated by rotation of the rotor block, a cylindrical body member including an inner friction face against which the friction areas of the shoes may engage when the shoes are forced outwardly about their respective pivot members by the toggle links as the toggle block moves radially outwardly along the guide post, and a power transmission element in fixed relation to the cylindrical body member.

2. A device in accordance with claim 1, in which the toggle block is elongate and includes opposed bifurcated ends providing channels receptive of the socket ends of the shoes, when the toggle block is extended outwardly along the guide post.

3. An automatic clutch operable by centrifugal force, comprising in combination, an elongate rotor block including means for fixedly mounting same upon a drive shaft, said block having an end revolvable about the shaft axis, a pair of shiftable elongate clutch shoes each including an arcuate friction area, and ends defining said friction area, a head at one end of each shoe offset from the friction area, and pivot members for rockingly mounting the heads of the shoes upon the end of the rotor block, a pair of spaced perforate ears at the remaining end of each shoe providing a socket thereon, a guide post fixed upon the rotor block to include the major axis thereof, said post having a free end extending radially of the drive shaft, a weighted toggle block having an enlarged central guide bore accommodating the guide post, and upon which the toggle block may slide radially between the shoes and lengthwise of the major axis of the rotor block, a pair of toggle links each having an outer end, means pivoting said ends within the sockets of the shoes, an inner end on each toggle link, and means pivoting said inner ends to the toggle block at opposite sides of the guide bore, means yieldingly opposing outward displacement of the toggle block by centrifugal force generated by rotation of the rotor block, a cylindrical body member including an inner friction face against which the friction areas of the shoes may engage when the shoes are forced outwardly about their respective pivot members of the toggle links as the toggle block moves radially outwardly along the guide post, and a power transmission element in fixed relation to the cylindrical body member.

4. An automatic clutch operable by centrifugal force, comprising in combination, an elongate rotor block including means for fixedly mounting same upon a drive shaft, said block having an end revolvable about the shaft axis, a pair of shiftable elongate clutch shoes each including an arcuate friction area, and opposed ends, means pivoting an end of each shoe to the end of the rotor block, a pair of spaced perforate ears at the remaining end of each shoe, providing a socket thereon, a guide post fixed upon the rotor block and having a free end extending radially of the drive shaft, a weighted toggle block having an enlarged central guide bore accommodating the guide post, and along which post the toggle block may slide radially of the drive shaft, said toggle block having opposite bifurcated ends providing channels receptive of the socket ends of the shoes, a pair of toggle links each having an outer end, means pivoting said link ends within the sockets of the shoes, an inner end on each toggle link, and means pivoting said inner ends to the toggle block, means yieldingly opposing outward displacement of the toggle block by centrifugal force, a cylindrical body member including an inner friction face against which the friction areas of the shoes may engage when the shoes are forced outwardly about their pivot means by the toggle links as the toggle block moves outwardly along the guide post under centrifugal action, and a power transmission element in fixed relation to the cylindrical body member.

5. An automatic clutch operable by centrifugal force, comprising in combination, a rotor block including means for fixedly mounting same upon a drive shaft, said block having an end revolvable about the shaft axis, a pair of shiftable elongate clutch shoes each including an arcuate friction area, and ends defining said friction area, a head at one end of each shoe offset from the friction area, and pivot members for rockingly mounting the heads of the shoes upon the end of the rotor block, a tail pivot at the remaining end of each shoe, a guide post fixed upon the rotor block, said post having a free end extending radially of the drive shaft, a weighted toggle block having an enlarged central guide bore accommodating the guide post, and upon which the toggle block may slide radially between the shoes and lengthwise of the post, a pair of toggle links each having an outer end attached to a tail pivot of a shoe, and an inner end pivoted to the rotor block end, a pair of springs yieldingly opposing outward displacement of the toggle block by centrifugal force generated by rotation of the rotor block, a cylindrical body member including an inner friction face to be engaged by the friction areas of the shoes, upon centrifugal extension of the links and the toggle block, said springs bearing against the rotor block to overcome part of the spring sensitivity when the springs are stretched incident to outward displacement of the toggle block, and a power transmission element in fixed relation to the cylindrical body member.

6. An automatic clutch operable by centrifugal force, comprising in combination, a rotor block having a swinging end, and including means for fixedly mounting same upon a drive shaft, a pair of shiftable elongate clutch shoes each including an arcuate friction area, and ends defining said area, means pivoting corresponding ends of the shoes to said swinging end of the rotor block, a shiftable toggle block having opposite ends, and means guiding said toggle block to move radially of the drive shaft in the plane of the rotor block opposite to the swinging end of the latter, a pair of toggle links each having an inner end pivoted to the toggle block, and outer ends on the links each pivoted to the remaining end of a clutch shoe, spring means yieldingly restraining radial movement of the toggle block in the outward direction, a cylindrical body member including an inner friction face against which the friction areas of the shoes may engage when the shoes are displaced outwardly by the action of centrifugal force, and a power transmission element in fixed relation to the cylindrical body member.

References Cited in the file of this patent

UNITED STATES PATENTS

| Number | Name | Date |
|---|---|---|
| 1,843,194 | Banker | Feb. 2, 1932 |
| 2,392,950 | Russell | Jan. 15, 1946 |

FOREIGN PATENTS

| Number | Country | Date |
|---|---|---|
| 121,981 | Great Britain | Jan. 3, 1919 |
| 165,340 | Germany | Sept. 11, 1904 |
| 357,764 | France | Jan. 13, 1906 |